Jan. 16, 1934. W. D. CHAMPION 1,943,367

OIL AND WATER SEPARATOR AND PETROLEUM PURIFIER

Filed March 19, 1929 7 Sheets-Sheet 1

Fig. 1a

Inventor
BY Wilburn D. Champion
Vernon C. Hodges
his ATTORNEY

Jan. 16, 1934.  W. D. CHAMPION  1,943,367
OIL AND WATER SEPARATOR AND PETROLEUM PURIFIER
Filed March 19, 1929  7 Sheets-Sheet 4

Jan. 16, 1934.  W. D. CHAMPION  1,943,367
OIL AND WATER SEPARATOR AND PETROLEUM PURIFIER
Filed March 19, 1929  7 Sheets-Sheet 6

Fig. 6.

Inventor
Wilburn D. Champion
BY Vernon G. Hodges
his ATTORNEY

Inventor
Wilburn D. Champion
By Vernon C. Hodges
his ATTORNEY

Patented Jan. 16, 1934

1,943,367

UNITED STATES PATENT OFFICE 1,943,367

OIL AND WATER SEPARATOR AND PETROLEUM PURIFIER

Wilburn D. Champion, Pampa, Tex.

Application March 19, 1929. Serial No. 348,249

37 Claims. (Cl. 210—59)

This invention relates to an improvement in oil and water separator, and petroleum purifier.

The object of the invention is to separate oil from water and other impurities and to purify the oil at the same time as the separation, taking out all impurities which are obtained from the oil well, such as water, becknite, shale, wax, salt, sulphur, acids of different kinds, and many other substances which are contained in the crude oil as it is withdrawn from the well. These substances are very injurious to the oil and are also expensive to refineries and producers.

Heretofore, it has been very difficult and almost impossible to extract foreign substances and all of the water from the crude oil produced, and this invention is perfected for such purposes and to reduce the expense and trouble incident to attempts to remove such foreign substances as well as to produce a more valuable grade of oil with a higher gravity.

The present invention is in the nature of a separator to be placed near tank batteries or other convenient location to production in such position as to separate all of the water and foreign substances from the crude oil without the loss of any of the oil.

This invention not only automatically separates the water from the oil with much less expense but also prevents the possibility of fire, which frequently occurs at present from waste oil draining from tank batteries through water bleeders. It also eliminates the great expense to producers of installing so many tanks, which they are forced to do to take care of excessive production because of the presence of water in the oil. The water and all foreign substances are extracted from the oil as it is purified with the present invention before the oil is directed into stock tanks, thereby preserving the tanks as well as eliminating the use of as many as heretofore required.

In the accompanying drawings:

Fig. 1a designates a sectional view through the upper portion of the separator;

Fig. 3 is a sectional view through the discharge valve;

In the production of crude oil, there are many different kinds of water, oil and acids that occur in the crude oil as withdrawn from the oil wells. There are three different kinds of water that frequently occur in crude oil when the oil is extracted from the earth, namely soft water, salt water and dead-sea water. The acids which are the most important are usually sulphuric and muriatic. The crude oils are usually those with paraffin or asphalt bases.

A test table for these is as follows:—

|  | Weight per gal. | Approx. gravity | Friction |
|---|---|---|---|
| *Water* |  |  | *Percent* |
| Soft water | 8# | 10 | 30 |
| Salt water | 10# | 8 | 45 |
| Dead-sea water | 10½# | 6 | 65 |
| *Acids* |  |  |  |
| Sulphuric acid | 15½# | 20 | 80 |
| Muriatic acid | 15# | 25 | 45 |
| *Crude oils* |  |  |  |
| Paraffin base | 5# to 8# | 10 to 66 | 5 to 8 |
| Asphalt base | 6# to 10# | 8 to 40 | 6 to 10 |

When the waters are placed under a temperature of 200° F. and fifty pounds working pressure, the friction is raised and the gravity lowered. There is a very small change in the acids contained in the crude oil, but when the crude oils go through the same process, the gravity is raised and the friction lowered.

The friction of crude oils, waters and acids may be best understood by the following illustration:—

A gallon of crude oil forced through a special built machine having a relatively small coil tube of a size of six feet by one-sixteenth inch, with a fluid speedometer, and placed under a working pressure of fifty pounds and 200° F., the gallon of oil will pass through the tube at a predetermined speed and in a definite length of time. This time and speed in which it takes for the oil to pass through the tube at a fixed pressure and temperature determines the friction which the fluid has.

Referring to the accompanying drawings which illustrate one form of the separator and oil purifying system, the numeral 1 designates a pipe connected with a flow tank for the purpose of withdrawing the crude oil therefrom, which crude oil thus withdrawn contains the impurities which are in it as withdrawn from the earth. The crude oil or fluid may be forced through the pipe 1 by a suitable pump connected therewith or by suction or vacuum applied to the opposite end of the system, which will serve to force or draw the fluid through the pipe.

Figures 4, 5, 9:
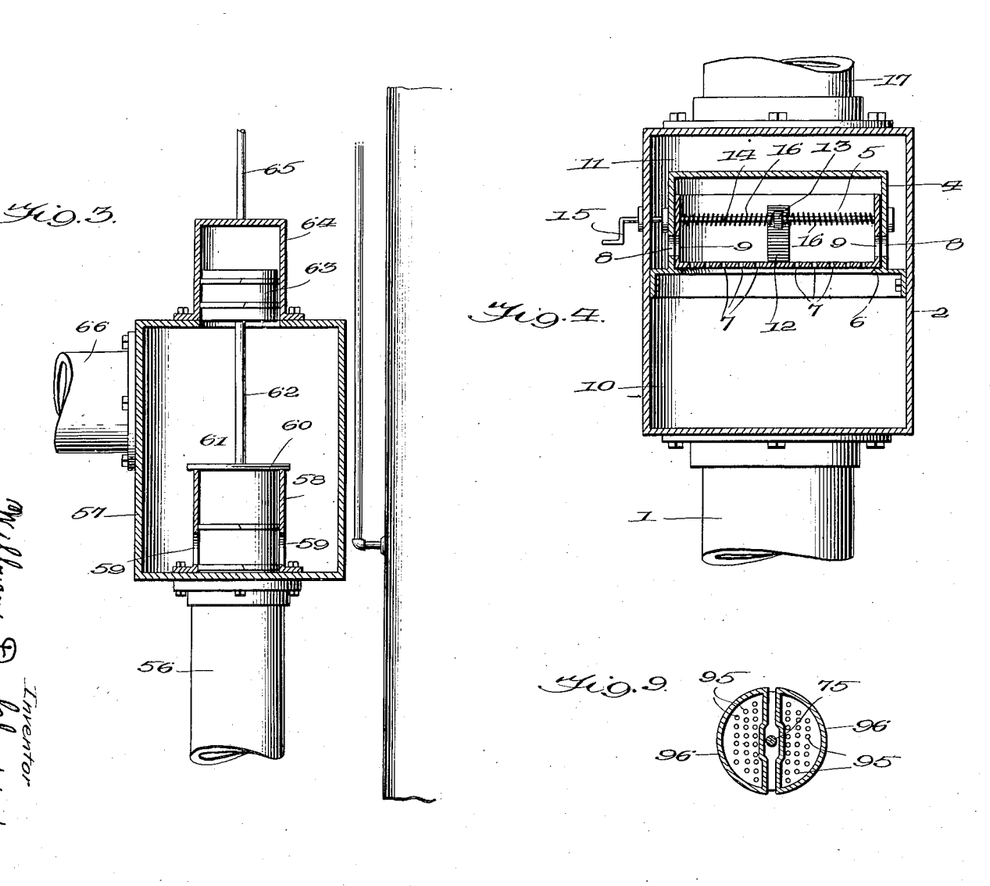
Fig. 4 is a similar view through the inlet regulating valve.
Fig. 5 is a sectional view of an automatic separating valve.
Fig. 9 is a sectional view on the line 9—9 of Fig. 5.
Figure 5:
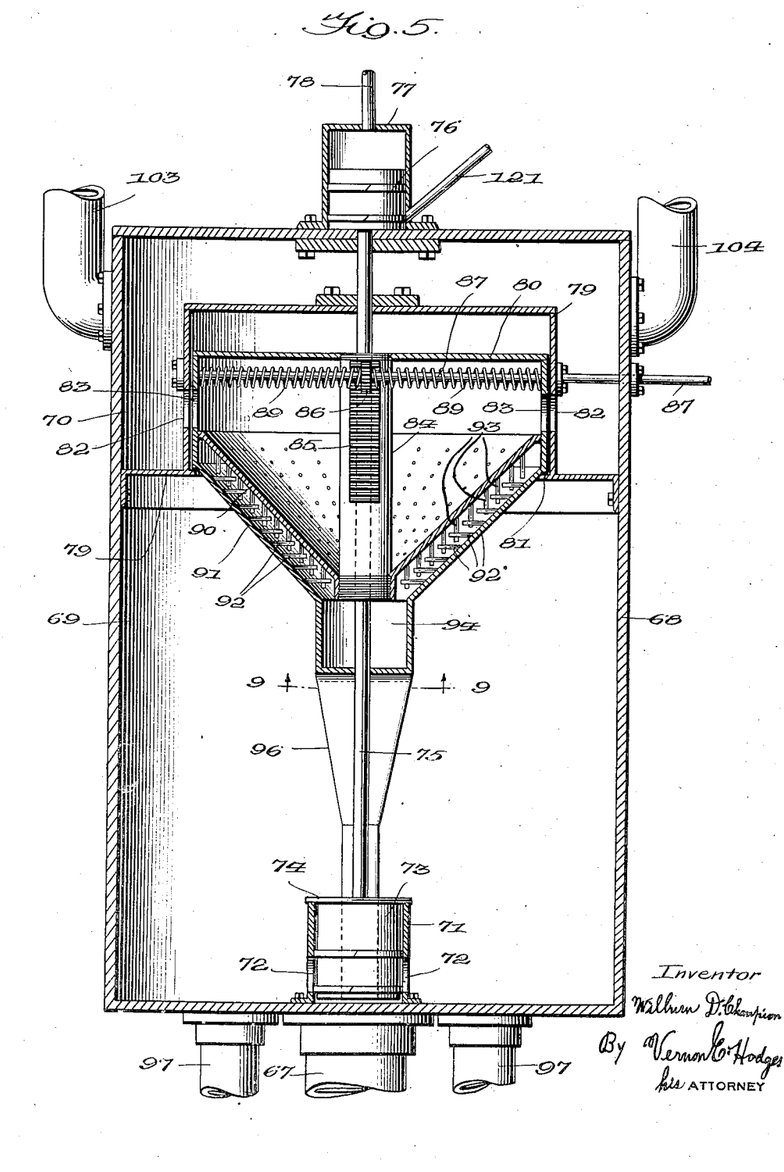

The pipe 1 is connected with an inlet regulating valve designated generally by the numeral 2, as shown in Fig. 4, the pipe 1 communicating with the interior of the lower portion of the valve.

A cylinder 4 is fixed within the valve 2 and receives a piston 5 slidably mounted therein and of approximately the same shape as the cylinder 4, the piston 5 being retained in the cylinder by a lug or rim 6 formed on the open lower end of the latter. The piston 5 has its bottom perforated as at 7, to permit the crude oil or fluid to flow thereinto through these perforations.

The cylinder 4 and piston 5 have aligned openings 8 and 9 respectively formed therein on different sides for the purpose of permitting the fluid or oil which passes into the piston 5 to flow through these openings into the upper chamber of the valve casing 2. The cylinder 4 being secured to the walls of the valve 2 divides this valve into lower and upper chambers, which may be designated by the numerals 10 and 11 respectively. The extent of communication through the openings 8 and 9 and the amount of oil flowing therethrough may be regulated by adjusting the piston within the cylinder 4. For this purpose the piston 5 is provided with a mandrel 12 therein, on which teeth are formed for the reception of a pinion 13 freely mounted on a shaft 14, journaled in the opposite sides of the cylinder 4 and extending through slots on the opposite sides of the piston 5, said shaft 14 terminating at its outer end in a handle 15.

Sleeved over the shaft 14 and on opposite sides of the pinion 13 are oppositely coiled spiral springs 16, having their inner ends fixed to the pinion 13 and their outer ends fixed to the shaft 14, so that when the shaft is turned, this turning movement is imparted to the springs which, in turn, cause a rotation of the pinion 13 to adjust the position of the piston 5.

Communicating with the upper chamber 11 in the valve 2 is a suction pipe 17 extending upwardly therefrom and turned inwardly as at 18 in a horizontal position 19, which has a discharge nozzle 20 on the inner end thereof for discharging the oil and fluid in a general downward direction. The horizontal section 19 of the suction pipe extends through the outer wall 21 of the separator and the discharge nozzle 20 is located in the upper inlet chamber 22 closed at its top by a header plate 23. The nozzle 20 discharges the oil immediately over and in relatively close proximity to the apex of a conical division shield 24, which terminates at its lower edge in a flange 25 provided with relatively small holes 26 therein, which communicate with a chamber 27. The holes 26 are arranged around the cone 24, as shown in Figs. 1a and 2, so that the crude oil may flow down the sides of the conical shield 24 and through the holes 26. The conical shield 24 is securely fastened at its outer edge to the outer casing 21 of the separator.

Located immediately beneath the holes 26 and below the chamber 27 are a large number of tubes 28, having their upper ends mounted in a ring 29, secured at its outer edge to the casing 21 and at its inner edge to a plate 30, which serves to form the bottom of the chamber 27 and to close the chamber at the center. At their lower ends, the tubes 28 are mounted in a plate 31 spaced above the bottom 32 of the casing 21 of the separator and forming a chamber 33 therebetween, into which the tubes 28 discharge, An inner casing 34 of smaller diameter than the outer casing 21 and spaced from the walls thereof has its upper end fixed to the plate 30 and its lower end to the plate 31, forming a heating chamber 35 between the casings 21 and 34 for the reception of steam, which is admitted to this heating chamber through the pipe 36, shown in Fig. 1b and is adapted to surround the tubes 28 to heat the fluid or crude oil passing therethrough and maintaining a constant temperature, and it also supplies heat to the entire separator. Any condensed liquid from this steam may be withdrawn at the bottom of the chamber 35 through a pipe 37.

A division plate 38 is arranged within the inner casing 34 and spaced above bottom plate 31 forming an auxiliary heating chamber 39 between the plates 31 and 38, which communicates with the heating chamber 35 through the port holes 40 in the sides thereof.

A header plate 41 is also provided within the inner casing 34 in the intermediate portion of the separator, forming a heating compartment 42 within the inner casing 34, which also communicates with the heating chamber 35 through port holes 43, receiving steam therethrough for the heating purposes and allowing the discharge of any products of condensation.

Arranged within the inner casing 34 and above the plate 38 is a breaking and united receiving compartment 44, which is closed at its top by means of a plate 45 fixed at its outer edges to the inner casing 34. Arranged between the plates 41 and 45 is also a water and oil chamber 46. This will be hereinafter referred to.

Figure 1B:
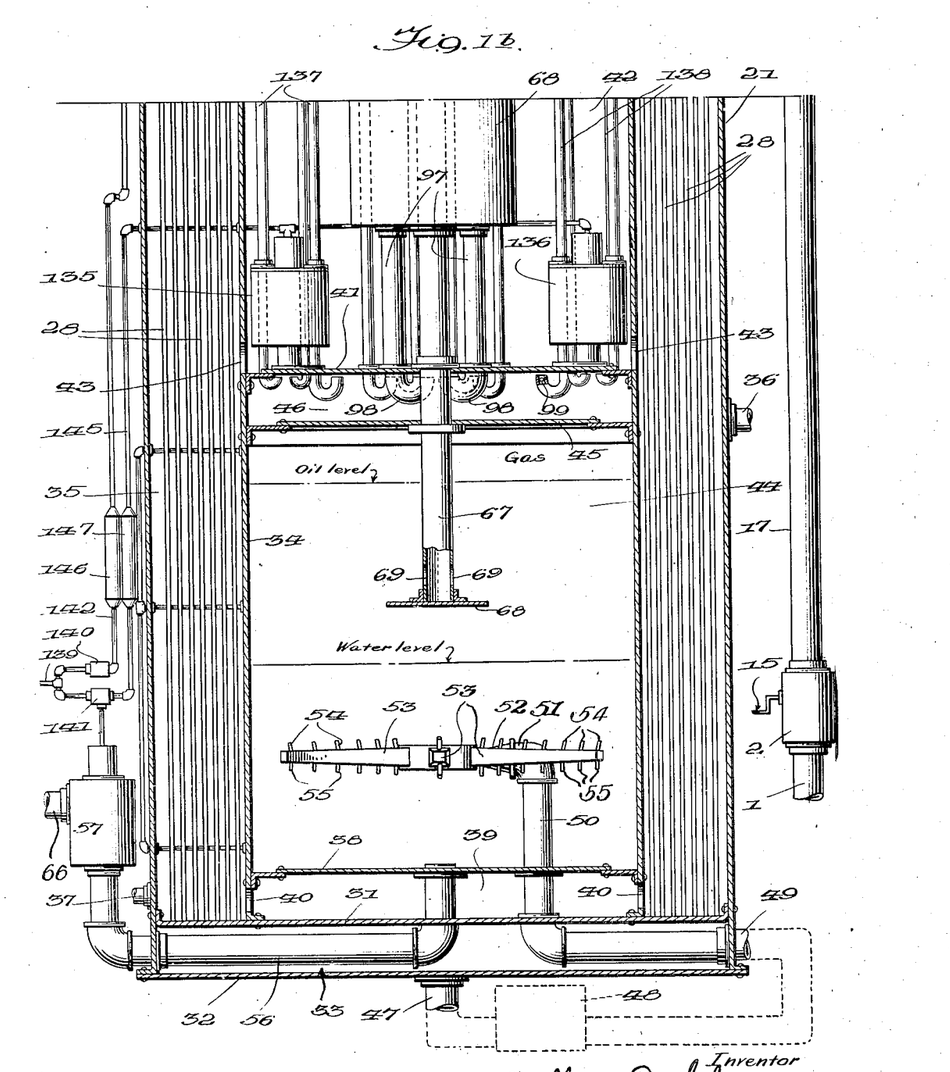
Fig. 1b is a similar view through the lower portion.
Figure 2:
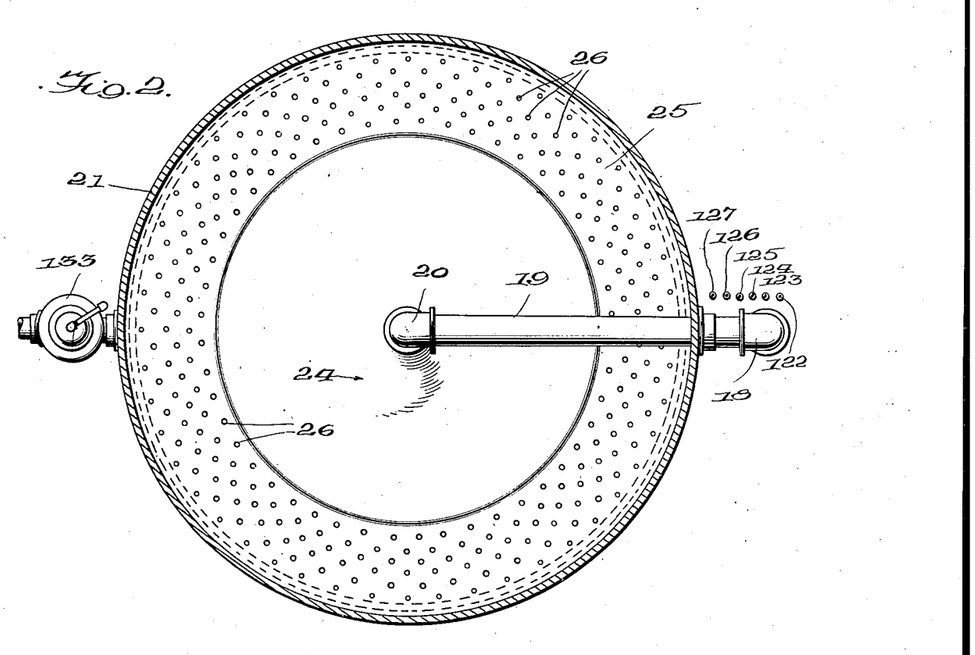
Fig. 2 is a horizontal section through the inlet chamber.

A suction pipe 47 extends from and communicates with the bottom chamber 33 of the separator for directing the crude oil therefrom, and this pipe extends to and is connected with a pump 48, shown diagrammatically in Fig. 1b, from which the crude oil is pumped through a pipe 49, which extends through the bottom chamber 33 and is then directed upwardly with a vertical section 50, and again horizontal as at 51, terminating in a reducer 52, which communicates with a distributor 53. This distributor may be in the form of a six-pointed star and tubular for the reception of the crude oil from the reducer 52.

The distributor 53 is arranged approximately horizontally within the breaking and united receiving compartment 44 and below the water level line therein. As the crude oil is forced through the pipes relatively slowly, the oil being lighter than the water and other impurities, will have a tendency to accumulate above the surface of the water. As the oil, water and acids, forming the crude oil, flow into the distributor 53, therefore the oil automatically assumes a position over the water and impurities. Arranged around the distributor 53 and in the top thereof are upwardly inclined tubes or discharge nipples 54, for allowing the oil to flow upward from the distributor. Similar nipples 55 are provided in the bottom of the distributor to allow the downward passage of the water and acids. The nipples 55 may be slightly larger than the nipples 54 and may be arranged vertically.

The inclination of the nipples 54 and the relatively small size of these serves the purpose of breaking the body of oil which flows from the distributor 53. As the crude oil containing the water and acids is forced through the distributor 53 under pressure, the water being heavier will assume a lower position and have a tendency to flow downward through the nipples 55 while the oil will flow upward through the nipples 54, thereby breaking up the fluids and separating a large portion of the water and impurities from the oil.

The acids and foreign substances being of a similar gravity as water will, to a large extent, remain in the water by this arrangement of distribution.

This breaking up of the crude oil therefore forms in the chamber 44 a lower body of water containing a large portion of the foreign substances and acids, above which is disposed the oil, from which at least some of the impurities have been removed in the breaking up process, and because of the cracking of the oil during the breaking up process, a certain amount of gas is liberated, which accumulates above the body of the oil.

A pipe 56 extends from the bottom of the breaking and united receiving compartment 44 through the outer casing 21 of the separator and communicates with an automatic pressure regulating valve 57. The body of the valve 57 has a fluid cylinder 58 fixed therein, communicating at its lower end with the pipe 56 and being open at its upper end. Openings 59 are provided in the sides of the cylinder 58 to be regulated by a piston 60 disposed within the cylinder and extending approximately the entire length thereof, being provided with the flange 61 for regulating the extent of the downward movement of the piston in the cylinder. The piston rod 62 connects the piston 60 with a piston 63 disposed within an air cylinder 64, closed at its outer end and having its inner end communicating with the valve 57.

An air pressure pipe 65 opens into the outer end of the air cylinder 64 for admitting air to said cylinder to act on the piston 63 and for regulating the discharge of fluid into and through the valve 57. A pipe 66 extends from the valve 57 for carrying off the water and impurities withdrawn from the separator.

When oil is pumped into the distributor 53 and discharged therefrom into the breaking and united receiving compartment 44 by reason of the pressure placed thereon, which creates a pressure on the gas contained in the top of the compartment 44 above the oil level, and when this gas is compressed to a predetermined extent, this will act to force the water from the bottom of the compartment 44 through the pipe 56 and the valve 57, overcoming the pressure on the piston 63, and allowing a discharge of the water and acids through the pipe 66.

In order that this oscillation within the compartment 44 may also force the oil therefrom, a delivery pipe 67 extends downwardly into the compartment 44 only into the body of the oil contained therein. The pipe 67 is closed at its lower end by a plate 68 and is provided with inlet holes 69 in the sides thereof immediately above the plate 68 for the admission of the oil into the pipe 67 and the forcing of the oil out of the compartment 44 through the pipe 67 by means of the pressure of the gas contained within said compartment. The oil and water is forced out of the compartment by the gas pressure until the pressure is reduced. This oscillation process is for the purpose of assisting gravity and friction to break up the water, acids and foreign substances from the oil.

A master valve is designated by the numeral 68 as it is shown in detail in Figs. 5–9. This valve has the casing thereof divided into upper and lower chambers 69 and 70. Disposed within the lower chamber 69 at the bottom thereof is a fluid cylinder 71, communicating at its lower end with the pipe 67 for receiving the oil therefrom. The fluid cylinder 71 has openings 72 in the sides thereof controlled by a piston 73, similar to the construction and operation of the piston 60, shown in Fig. 3. The piston 73 extends approximately throughout the length of the cylinder 71 and is provided with a flange 74 for closing the outer end of the cylinder. A connecting rod 75 extends from the piston 73 to a piston 76 disposed within an air cylinder 77 located above the valve casing 68. The opposite ends of the cylinder 77 are closed and the outer end has an air pipe 78 communicating therewith for supplying air pressure to act on the piston 76, normally tending to hold the piston 73 in its lowermost position.

A cylinder 79 serves to divide the casing 68 into the compartments 69 and 70, being disposed between the compartments, and this cylinder 79 has an adjusting piston 80 mounted therein, being retained in the cylinder 79 by reason of the lug or projection 81 formed at the lower end thereof. Aligned openings 82 and 83 are provided in the sides of the cylinder 79 and piston 80 respectively for the purpose of establishing communication between the interior of the piston 80 and the upper chamber 70.

For the purpose of regulating the extent of this communication and the position of the piston in the cylinder 79, a mandrel 84 is fixed to the piston 80 and provided with teeth 85 to mesh with a pinion 86 for adjusting the position of the mandrel and piston. The pinion 86 is loosely mounted on a shaft 87 journaled in the cylinder 79 and extending therefrom through the casing 68 and the casings 34 and 21 of the separator to the outside of the latter, where it terminates in a handle 88 by which the shaft may be adjusted to turn the pinion for adjusting the position of the piston. Sleeved over the shaft 87 on opposite sides of the pinion 86 are oppositely coiled springs 89, having their inner ends fixed to the pinion 86 and their outer ends fixed to the shaft 87, so that upon rotation of the shaft the movement thereof will be communicated through the springs 89 to the pinion 86 to turn this pinion.

Figure 6:
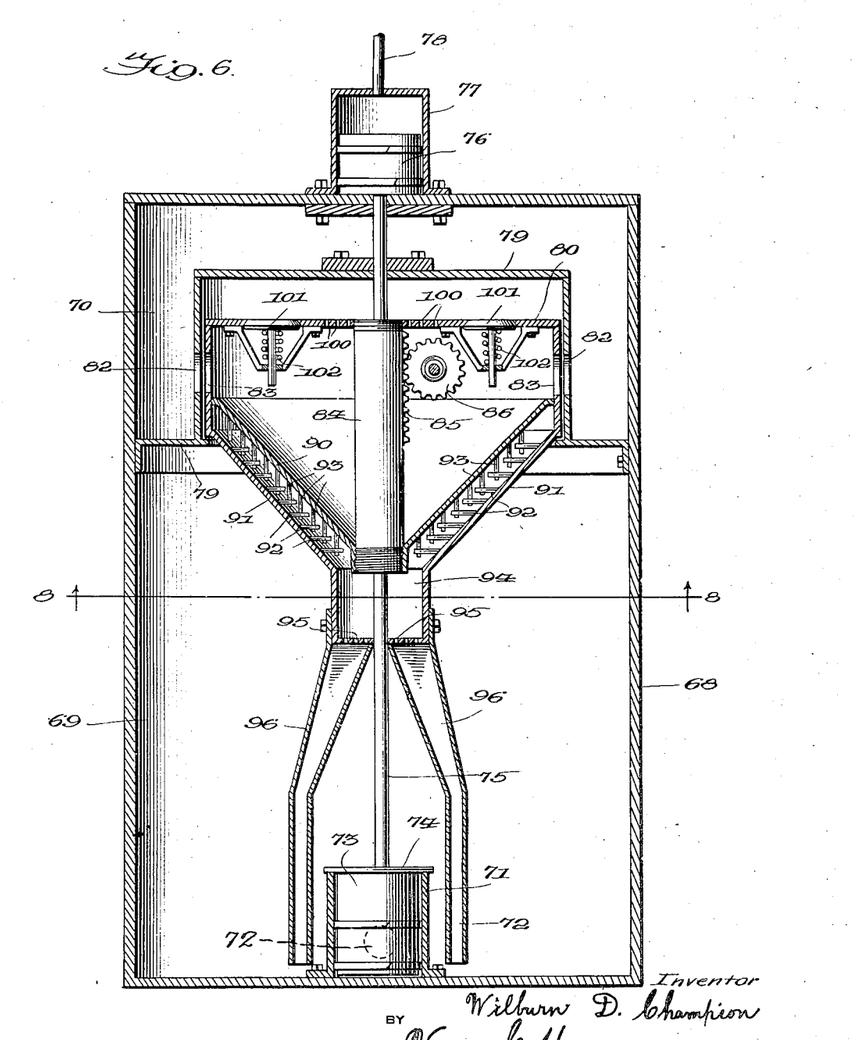
Fig. 6 is a similar view of the same taken approximately at right angles to Fig. 5.
Figure 7:
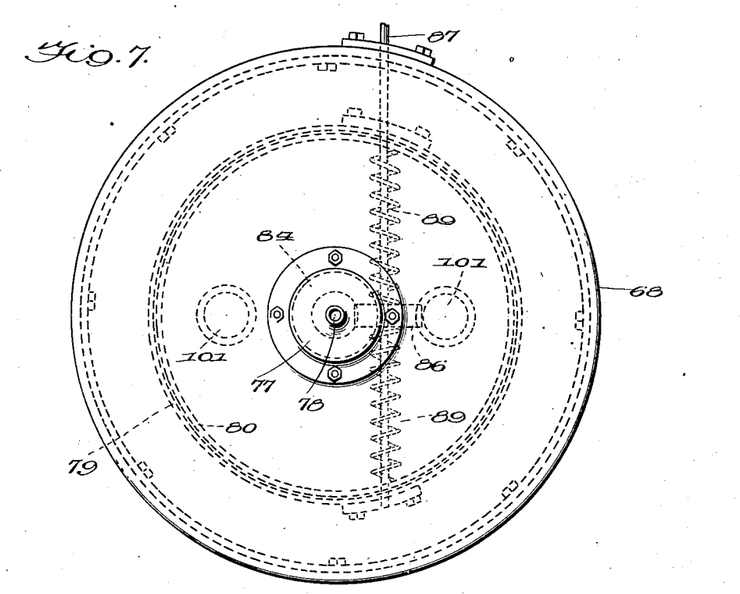
Fig. 7 is a top plan view of the separating valve.
Figure 7A:
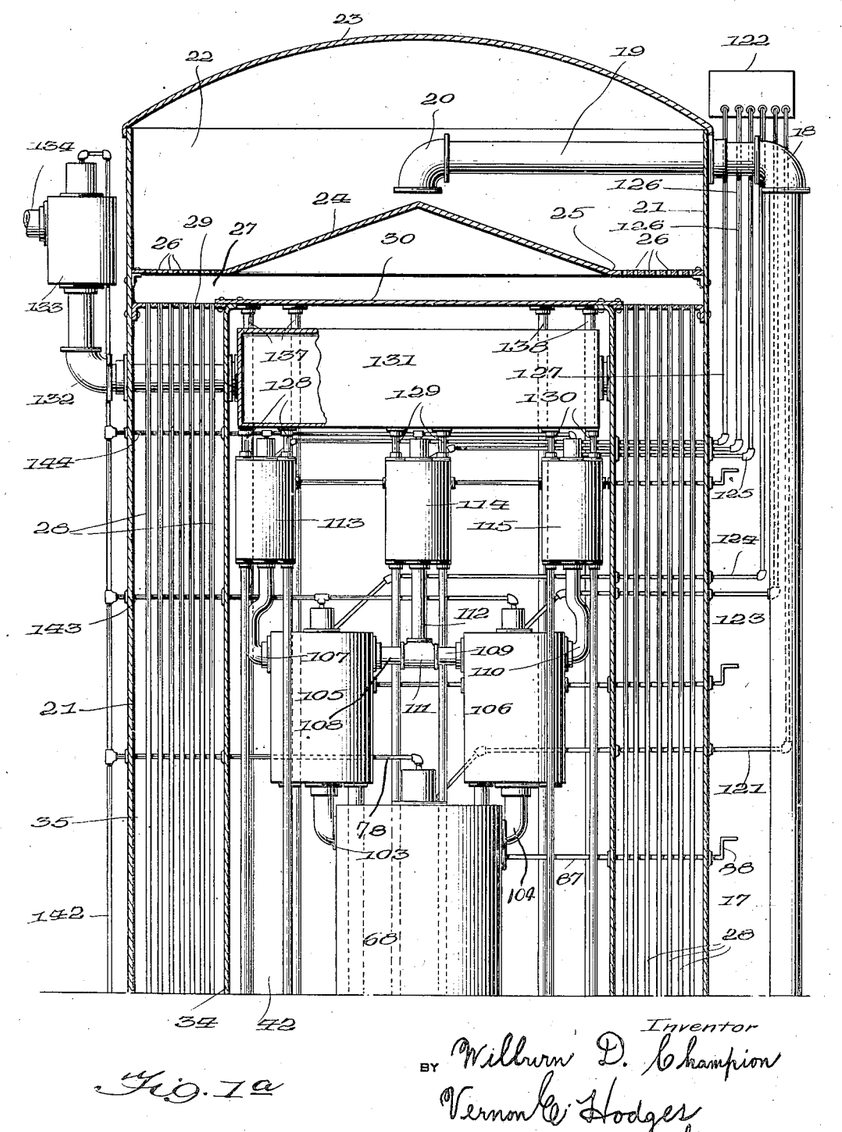
Figure 8:
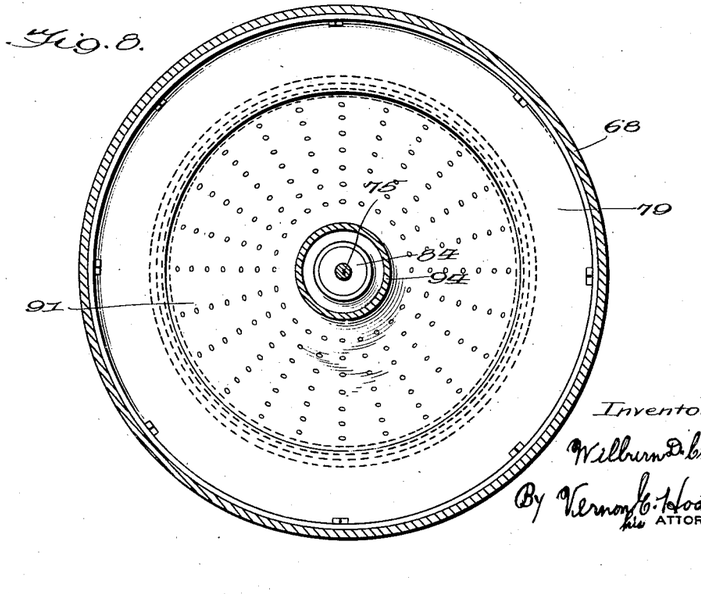
Fig. 8 is a sectional view on the line 8—8 of Fig. 6.

Internal and external inverted cone-shaped shields 90 and 91 respectively have their outer edges joined and secured to the walls of the piston 80, and are arranged in spaced apart relation, as shown in Figs. 5 and 6, forming the bottom of the piston 80. The external shield 91 carries a relatively large number of small inlet tubes 92 extending in horizontal direction into the space between the shields 90 and 91 for the purpose of breaking the volume of oil to very small bits.

The inner shield 90 carries a large number of small tubes 93 that are arranged vertically to allow the oil to flow from the space between the shields into the piston 80, from where it is forced through the openings 82 and 83 into the upper chamber 70 of the valve. As the oil rises in the chamber 69 and flows through the inlet tubes 92, the oil, being lighter in weight than the water contained therein, will have a tendency to rise to the top surface of the water and through the tubes 93 into the piston, thence to the upper chamber 70, while the water and foreign substances, being heavier and more affected by gravity, will strike the internal shield 90, being arranged at an angle approximately 45° and will be deflected downwardly therefrom into the receiving cell 94 at the lowest point of the outer shield 91, from which it flows through the holes 95 in the bottom of this cell, as shown in Fig. 6, into and through channels 96, which extend down on opposite sides of the fluid cylinder 71 and to points in close proximity to the bottom of the valve casing 68 for discharging the water and foreign substances into the immediate bottom of the casing at points approximately below the openings 72 of the cylinder 71.

Pipes 97 extend downwardly from the bottom of the casing 68 for carrying this water and foreign substances downward into the water and oil chamber 46. The pipes 97 may terminate in goosenecks 98, within which may be disposed a valve 99 of suitable construction for maintaining the liquid in the chamber 46 at a proper height.

In order to brace the inner shield 90, it is connected at its lower end to the mandrel 84, as shown in Figs. 5 and 6.

As the piston 80 may be adjusted upwardly within the cylinder 79, small openings 100 may be arranged in the top of the piston 80 to allow a slight circulation of air or gas from within the piston 80 into the space above the piston to prevent the creation of a vacuum thereabove, whenever the piston is lowered in the cylinder 79. Valves 101 are mounted in the top of the piston 80, as shown in Fig. 6, and normally pressed upwardly or closed by springs 102, but are adapted to be opened whenever the piston 80 is moved upward in the cylinder 79 to automatically release the air or gas from within the space above the piston into the piston so as not to create an undesirable pressure above the piston and acting thereon.

Arranged above the master valve 68 is a series of similar separating valves through which the oil is successively passed for the removal of any impurities contained therein and not removed by the master valve. The construction of these separators is covered by a divisional application Serial No. 454,491, filed May 21, 1930.

Figure 10:
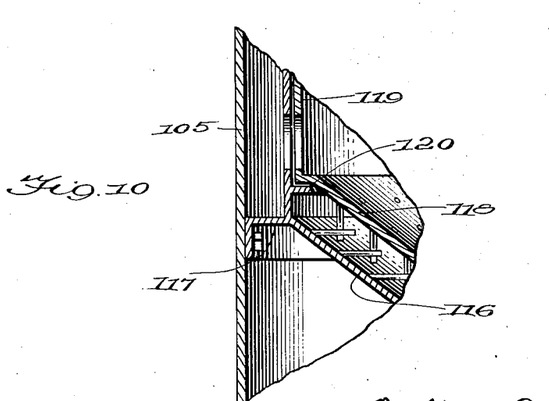
Fig. 10 is a detail sectional view of one of the subsidiary separating valves.

Extending upwardly from the opposite sides of the upper chamber 70 of the master valve 68 are pipes 103 and 104, which extend respectively to subsidiary valves 105 and 106. Extending from corresponding portions of this first set of subsidiary valves 105 and 106 are similar pipes 107, 108, 109 and 110. The pipes 108 and 109 are joined together as at 111, from which the pipe 112 extends upwardly. The pipes 107, 112 and 110 respectively extend to the second set of subsidiary valves 113, 114 and 115. The two sets of subsidiary valves 105, 106, 113, 114 and 115 are all of approximately the same construction and operation as the master valve 68, such as illustrated in Figs. 5 to 9 inclusive, with the exception of the slight change shown in Fig. 10, in which the outside conical shield 116 is formed on and as a part of the cylinder 117, while the inside shield 118 forms the bottom of the piston 119, being retained in position by a flange or rib 120. Otherwise, the construction is the same and need not be described in detail.

Extending from the base or lower end of the air cylinder 77, as shown in Figs. 1a and 5, is a breather and lubricator pipe 121, which communicates with the internal surface of the cylinder 77 and extends therefrom to the breather and lubricating box 122, as shown in Fig. 1a.

Similar pipes 123, 124, 125, 126 and 127 extend to the air cylinders of each of the subsidiary separating valves 106, 105, 115, 114 and 113 respectively. The purpose of these tubes is to permit lubricating oil to pass from the box 122 in measured quantities or drops to the bases of the respective air cylinders for the purpose of lubricating the internal surfaces of the cylinders, facilitating the operation of the pistons therein. Since the lower ends of the cylinders are closed and since some of the air admitted to the outer ends of the cylinders may find its way past the pistons into the inner ends of the cylinders, these pipes are also provided for allowing any of such air to pass off to the breather box 122, where it is discharged.

Extending from the top of each of the second set of subsidiary separating valves 113, 114 and 115 are discharge pipes 128, 129 and 130 respectively, which receive the oil from the upper chamber of each of the separating valves and direct it into the discharge compartment 131 supported in the upper end of the inner casing 34. A pipe 132 extends from the discharge compartment 131 to an oil discharge valve 133, which is of the same construction as the water discharge valve 57, shown in Fig. 3, and therefore needs no detailed description. A pipe 134 receives the oil from the valve 133 and directs it to any desirable place, such as storage tanks.

Arranged immediately over the oil and water compartment 46 are valves 135 and 136, which are also of the same construction as the valve 57 shown in Fig. 3. These valves 135 and 136 receive the crude oil from the oil and water compartment 46, which crude oil has been returned to said compartment from the separating valves, as not being pure oil and as containing water or other impurities.

Pipes 137 and 138 extend upwardly from the top of the valves 135 and 136 to the compartment 27 at the top of the separator for directing the crude oil into said compartment from where it is again recirculated down through the tubes 28 for recirculation through the separator.

As shown in Fig. 1b, a source of fluid or air supply 139 communicates with automatic regulators 140 and 141 of suitable construction, one of which is connected with an air pipe 142, which extends upwardly beside the separator and is connected with the pipe 78 leading to the air cylinder of the master valve 68 and also to a pipe 143 leading to the air cylinders of the first set of subsidiary separating valves 105 and 106 and a pipe 144 extending to the air cylinders of the second set of subsidiary separating valves 113, 114 and 115. The pipe 142 is connected with the air cylinder of the oil discharge valve 133, as shown in Fig. 1a.

The pipe 145 extends to the air cylinders of the valves 135 and 136 from the automatic regulator 141. This regulator also has the air pipe 65 connected therewith and extending to the water discharge valve 57.

The pipes 142 and 145 have volume tanks 146 and 147 contained therein for cushioning the air pressure on the pistons.

*Operation*

In the operation of the separator or oil purifying system, the suction of the pump 48 at the base of the separator is applied through the separator to the pipe 17, the valve 2 and the pipe 1, for withdrawing the crude oil from the tank or other source with which the pipe 1 may be connected. The valve 2 regulates the amount of fluid drawn through the pipes and into the separator. The crude oil is discharged through the nozzle 20 onto the apex of the division shield 24 from where it flows down the sides of the cone shaped shield and through the openings 26 and into the tubes 28. These tubes are relatively small in size but large in number and the flow of the crude oil is by both suction and gravity acting thereon. As the oil flows down through the tubes 28, it is heated by reason of the presence of steam within the heating chamber 35, which steam surrounds the tubes 28, through which the oil is passing.

The slow movement of the oil through these tubes facilitates a breaking up of the crude oil or the uniting of the waters, acids and oils in separate bodies, with a tendency to separate these from each other. The oils flow from the tubes 28 into the bottom chamber 33, from where they pass through the pump 48 into the pipe 49, under the pressure of the pump. Throughout this movement the heat is maintained approximately constant for maintaining a uniform temperature for the crude oil passing through the tubes and as it also passes into the united breaking and receiving compartment 44 and through the separating valves and into the discharge compartment 131.

From the pipe 49 the oils pass upward through the section 50 and into the distributor 53. The discharge pipe from the pump permits the oils to lubricate to the top of the pipe as the position of the pipe is changed and, as all fluids are discharged from the distributor 53 in this relation, the oils flow upward through the nipples 54 while the water and acids, uniting as a body and being heavier than the oils and more affected by gravity, flow downward through the bottom nipples 55. The oils lubricate and roll to the top of the water level uniting in a body above the body of the water.

The pressure created by the pump on the body of oil causes a heavy vapor or gas to rise from the oil, which accumulates in the top of the compartment 44, which gas is compressed as additional oil is forced into the compartment and acts as a cushion or creates an oscillation within the compartment with a tendency to force the oils and waters outward therefrom.

The placing of the water under the pressure of this gas causes it to become cooler whereas the pressure on the oil increases its temperature, which further tends to maintain the separate bodies of the oil and water.

Whenever the water level and oil level in the compartment 44 have reached a certain height, the pressure of the gas in the top of the compartment will act to create a pressure against the fluid pistons in the valve 57 for the discharge of the water and the master valve 68 for the discharge of the oil, but the height of the water is always maintained the same, and it is only when additional water and oil is forced into the compartment that there is a discharge. The water level is maintained in the compartment for the purpose of washing the oils and removing the water and acids therefrom as the oils roll and lubricate through the body of water. The increase of gas pressure causes some of the gas vapor in contact with the surface of the oil to be reabsorbed by the oil and also due to such increase in pressure there is a discharge of oil from the compartment through the pipe 67, lowering the pressure on the gas sufficiently so that as more oil is pumped into the compartment, additional gas is liberated therefrom. When the oil is discharged by the gas pressure, the oil level is lowered and this continues until the pressure of the gas is less than the pressure on the piston 73, whereby the latter piston is closed, cutting off the discharge and again building up the gas pressure.

A continuous and uniform pressure is maintained on the pistons, which regulate the valves at all times by the compressed air system; first to apply pressure to the oils; second, to raise the gravity by absorbing the vapor or gas, and thereby lowering the friction by making it more nearly pure oil by the removal of impurities; third, to create a rolling process within the separating valves and to eliminate a direct pressure to be placed against the base of the cone-shaped division shields in the separating valves; fourth to maintain a certain pressure of a definite speed of the flow of oil to the separating valves at all times; and fifth to hold the oil that has passed through the separating valves to prevent it from returning to the base of the separator.

The pressure on the body of oil forces this oil out through the pipe 67 into the lower chamber of the master separating valve 68 and up through this valve to the outer cone-shaped shield 91, through which it is forced through the tubes 92 which act to separate the oil from any water or acids that may be contained therein, and the oil being light in weight will flow up through the vertical tubes 93 into the piston 80, from where it is discharged through the openings 82 and 83 into the upper chamber 70 of the valve.

The water and acids that may be separated from the oil are directed downward into the discharge cup 94 and through the channels 96 to the bottom of the chamber 69, from where they are led downward through the pipes 97 into the oil and water chamber 46. The oil is forced upward through the several subsidiary separating valves and finally is discharged into the chamber 131, from where it is withdrawn from the separator.

As the oil passes through each of the series of separating valves, the purification and separating process continues for the purpose of withdrawing any impurities, such as water or acids, therefrom, all of which are returned to the oil and water chamber 46, from where they are forced back into the top chamber 27 for recirculation through the tubes 28 and the separator, while only the pure oil is discharged at the top.

The flow of oil into and through the separator may be regulated by each of the several valves provided therefor and the pressure on the pistons of the valves may also be regulated by the automatic regulators 140 and 141.

When the position of the piston 80 has been adjusted by the pinion 86, according to gravity and friction of crude oil, and a heavier fluid which carries greater friction with it such as water, acids and foreign substances, enters the valve 69 the piston will automatically raise, cutting off communication through the openings 82 and 83, thereby forcing this fluid back into the oil and water chamber 46, until this added friction is reduced according to the setting of the piston 86.

I claim:

1. An oil separator of the character described comprising an inlet chamber, an approximately conical deflection shield arranged in the bottom of said chamber and having a series of openings therethrough, means for discharging crude oil onto the deflection shield approximately at the apex thereof, a series of relatively small tubes arranged approximately vertically in the separator and communicating with the openings through the shield, and a heating chamber arranged in the separator and through which the tubes extend for maintaining an approximately constant temperature of the oil during the passage through said tubes.

2. An oil separator of the character described comprising a chamber, means located within said chamber for causing the oil and impurities to automatically separate into separate bodies by gravity and for the creation of a gas pressure in the upper portion of said chamber, and means for causing the removal of the separated oil and impurities by reason of the gas pressure in the chamber.

3. An oil separator of the character described comprising a chamber, a distributor disposed in said chamber approximately horizontally for the automatic separation of the oil and impurities into separate bodies, means for conducting the oil upwardly from the chamber, means for applying pressure on the top surface of the separated oil in the chamber sufficient to drive off the oil upwardly through said conducting means, means for supplying crude oil to said distributor, and means for heating said chamber.

4. An oil separator of the character described comprising a breaking and united receiving compartment, a distributor disposed within said compartment below the water level thereof and arranged approximately horizontally for the automatic separation of oil and impurities by gravity into separate contacting bodies in said compartment, and the creation of a gas pressure in the upper portion of the compartment, means extending into the body of the oil only, for the removal of the oil from the compartment, and separate means for removing the impurities.

5. An oil separator of the character described comprising a breaking and united receiving compartment, a distributor disposed within said compartment below the water level thereof and arranged approximately horizontally for the automatic separation of oil and impurities by gravity into separate contacting bodies in said compartment, and the creation of a gas pressure in the upper portion of the compartment, means extending into the body of the oil only, for the removal of the oil from the compartment, and separate means for removing the impurities, said oil and impurities being forced out automatically through said means by the gas pressure in the compartment, and heating means for maintaining an approximately constant temperature in said compartment.

6. An oil separator of the character described comprising a breaking and united receiving compartment, a distributor disposed approximately horizontally within said compartment, and in the lower portion thereof, said distributor having discharge nipples on the upper and lower sides thereof for the discharge respectively of the oil and the impurities in separate bodies and the maintaining of separate contacting bodies in said compartment, and a gas pressure in the top of said compartment normally acting on the bodies of oil and impurities, means for supplying crude oil to said distributor, and means for separately withdrawing the oil and impurities from the compartment.

7. An oil separator of the character described comprising a breaking and united receiving compartment, means for providing separate contacting bodies of oil and water in said compartment, and the creation of a gas pressure in the top of said compartment acting on said bodies, and a water discharge valve communicating with a body of water in the compartment for allowing the withdrawal of the water therefrom only by an increase in the gas pressure in said compartment and the increase in weight and volume of water.

8. An oil separator of the character described comprising a breaking and united receiving compartment, means for creating separate contacting bodies of oil and water in said compartment and of a gas pressure in the upper portion of said bodies and acting thereon, and normally closed discharge valves communicating separately and respectively with the bodies of oil and water to be opened only by an increase in the gas pressure in the compartment for the respective removal of the oil and water.

9. An oil separator of the character described comprising a breaking and united receiving compartment, means for admitting crude oil to said compartment and separating said oil into separate super-imposed contacting bodies of oil and water, and the creation of a gas pressure in the top of said compartment acting on the bodies of oil and water, a normally closed water discharge valve communicating with the bottom of the compartment, an oil discharge pipe extending into the top of said compartment, and communicating only with the body of oil therein, a normally closed oil discharge valve connected with said pipe, said normally closed discharge valves being opened and the oil and water forced therethrough only by an increase in the gas pressure in the top of said compartment, caused by the introduction of additional crude oil to said compartment.

10. A separator of the character described comprising a breaking and united receiving compartment for receiving crude oil and separating impurities therefrom, a series of separating valves through which the oil passes for successively removing impurities therefrom, and means for receiving the impurities from said valves and recirculating the same through the separator.

11. A separator of the character described comprising a breaking and united receiving compartment for receiving crude oil and separating impurities therefrom, a series of separating valves through which the oil passes for successively removing impurities therefrom, means for receiving the impurities from said valves and recirculating the same through the separator, a discharge compartment for receiving the pure oil from the separating valves, and means for maintaining said oil at an approximately constant temperature throughout the circulation through said separator.

12. An oil separator of the character described comprising separating means, means for regulating the passage of oil to said separating means, having a normally closed valve, and fluid actuated means other than the force of the oil for maintaining an approximately constant pressure on said valve in the direction of its movement for normally tending to maintain the valve closed.

13. A process of purifying oil comprising passing the oil through a large number of relatively minute tubes into a settling chamber to permit a separation of impurities therefrom by gravity, withdrawing the oil from said chamber, separating additional impurities therefrom outside of said chamber by one or more steps, and recirculating the impurities withdrawn by said last-mentioned steps through the tubes into the settling chamber with additional oil.

14. An oil purifying system comprising the steps of passing oil through a large number of relatively minute tubes into a settling chamber to permit the separation of oil from impurities by gravity, withdrawing the separated oil from said chamber, separating additional impurities therefrom outside of said chamber by one or more steps, recirculating the impurities withdrawn by said last-mentioned steps through the tubes into the settling chamber, and removing the separated impurities from said chamber.

15. An oil purifying system comprising the steps of passing oil through a large number of relatively minute tubes into a settling chamber to permit the separation of oil from impurities by gravity, withdrawing the separated oil from said chamber, separating additional impurities therefrom outside of said chamber by one or more steps, recirculating the impurities withdrawn by said last-mentioned steps through the tubes into the settling chamber, and removing the separated impurities from said chamber, the impurities separated from the oil in the system being removed only from the settling chamber, said separation being carried on in the presence of heat.

16. In an oil separator, a plurality of upright tubes through which the oil passes and having relatively minute internal openings to permit only slow movement of the oil therethrough, and means for directing oil downwardly through said tubes.

17. In an oil separator, a plurality of upright tubes through which the oil passes and having relatively minute internal openings to permit only slow movement of the oil therethrough, means for directing oil downwardly through said tubes and means for supplying heat to the oil passing through said tubes.

18. In an oil separator, a plurality of upright tubes through which oil passes downwardly by gravity, said tubes having relatively minute internal openings to permit only slow movement of the oil therethrough, means for directly oil downwardly through said tubes, and means for applying heat to the oil passing through said tubes.

19. In an oil separator, a plurality of approximately vertical tubes through which oil passes downwardly by gravity, said tubes having relatively minute internal openings to permit only slow movement of the oil therethrough and to allow a separation of impurities therefrom, means for supplying heat to the oil passing through said tubes, and means for supplying oil to the upper ends of said tubes.

20. An oil separator comprising an inlet chamber in the upper portion thereof, means for supplying crude oil to said chamber, and a plurality of relatively small tubes extending approximately vertically downwardly from said chamber and communicating therewith at their upper ends, allowing downward flow of the oil through the tubes by gravity, said tubes having relatively restricted internal openings to permit only slow movement of the oil therethrough.

21. An oil separator comprising an inlet chamber in the upper portion thereof, means for supplying crude oil to said chamber, a plurality of relatively small tubes extending approximately vertically downwardly from said chamber and communicating therewith at their upper ends, allowing downward flow of the oil through the tubes by gravity, said tubes having relatively restricted internal openings to permit only slow movement of the oil therethrough, and a heating chamber surrounding the tubes for supplying heat to the oil passing therethrough.

22. In an oil separator, an inlet chamber, an approximately conical deflection shield arranged in the bottom of said chamber, and having a plurality of openings therein, tubes extending downwardly from the openings and having relatively restricted internal openings to permit only slow movement of the oil therethrough and means for discharging oil onto the deflection shield approximately at the apex thereof.

23. In an oil separator, an inlet chamber, an approximately conical deflection shield arranged in the bottom of said chamber, and having a plurality of relatively small openings arranged about the base thereof, tubes extending downwardly from the openings and having relatively restricted internal openings to permit only slow movement of the oil therethrough and means for discharging oil onto the deflection shield approximately at the apex thereof.

24. In an oil separator, means forming an inlet chamber, an approximately conical deflection shield forming the bottom of said chamber, and having a plurality of relatively small openings arranged about the base portion thereof which forms a portion of the bottom of the inlet chamber, means for discharging oil onto the deflection shield approximately at the apex thereof, means for receiving the oil through said openings and separating impurities therefrom.

25. In an oil separator, a settling chamber, a distributor disposed within said chamber and having openings in the upper and lower portions thereof, for allowing an upward passage of oil and a downward passage of impurities therefrom inclined nipples attached to the upper openings, and a source of supply connected with said distributor.

26. In an oil separator, a settling chamber, a distributor disposed approximately horizontally within said chamber, relatively small tubes projecting upwardly and downwardly from said distributor, for separating oil and impurities and allowing an upward passage of oil and a downward passage of impurities from said distributor, the upper tubes being inclined and the lower tubes being of a slightly different size from the upper tubes, and means for supplying oil to said distributor.

27. An oil separator comprising a casing having an oil intake in the upper portion thereof, annular means for conducting said oil downwardly about the periphery of the separator, a breaking and united receiving compartment located in the lower portion of the separator and receiving the oil from such conducting means and allowing a separation of the oil and impurities into superimposed bodies, and a plurality of purifying devices arranged in series above the compartment and within the annular conducting means for receiving the oil from said compartment and successively separating impurities therefrom.

28. An oil separator comprising a casing having an oil intake in the upper portion thereof, annular means for conducting said oil downwardly about the periphery of the separator, a breaking and united receiving compartment located in the lower portion of the separator and receiving the oil from said conducting means, and allowing a separation of the oil and impurities into superimposed bodies, and a plurality of purifying devices arranged in series above the compartment and within the annular conducting means for receiving the oil from said compartment and sucessively separating impurities therefrom, means for returning the impurities from said devices to the compartment, means for removing impurities from said compartment, and means for supplying heat to the separator.

29. An oil separator comprising an inlet chamber, means for supplying crude oil to said chamber, and a plurality of approximately vertical tubes communicating with the chamber and through which the oil passes, said tubes having relatively minute internal openings to permit only slow movement of the oil therethrough.

30. An oil separator comprising an inlet chamber, means for supplying crude oil to said chamber and a plurality of approximately vertical tubes extending downwardly from the chamber and through which the oil passes, said tubes having relatively minute internal openings to permit only slow movement of the oil therethrough.

31. An oil separator comprising an inlet chamber, means for supplying crude oil to said chamber and a plurality of approximately vertical tubes extending downwardly from the chamber and through which the oil passes, said tubes having relatively minute internal openings to permit only slow movement of the oil therethrough, and means for circulating a heating fluid about and in contact with the external surfaces of the tubes.

32. In an oil separator, a plurality of upright tubes through which the oil is adapted to pass downwardly by gravity, each of said tubes having an internal opening of relatively minute diameter to permit only slow movement of the oil therethrough and facilitating the breaking up of the crude oil, and means for directing oil into the upper ends of said tubes.

33. In an oil separator, a plurality of upright tubes through which oil is adapted to pass downwardly by gravity, each of said tubes having an internal opening of relatively minute diameter to permit only slow movement of the oil therethrough, means for directing oil into the upper end portions of the tubes for downward passage therethrough, and means receiving the oil from the lower end portions of the tubes and separating impurities from the oil.

34. In an oil separator, a plurality of upright tubes through which oil is adapted to pass downwardly by gravity, each of said tubes having an internal opening of relatively minute diameter to permit only slow movement of the oil therethrough facilitating breaking up of the crude oil and the separation of impurities therefrom, means for heating the oil during passage through said tube, means for directing oil into the upper end portions of the tubes for downward passage therethrough, and means for receiving the oil from the lower end portions of the tubes and separating the oil from its impurities.

35. In the art of treating oil, the steps of passing oil into a chamber with a gas space above the surface of the oil, creating an increase of pressure on the gas in said gas space causing a reabsorption of at least a part of the gas by the oil, and discharging the oil from the chamber sufficient to lower the pressure and to permit the liberating of additional gas from oil entering the chamber.

36. In the art of treating oil, the steps of passing oil into a chamber while separating impurities from the oil passing into the chamber, with a gas space above the surface of the oil, creating an increase of pressure on the gas in said gas space causing a reabsorption of at least a part of the gas by the oil and causing a discharge of oil from the chamber sufficient to lower the pressure and to permit the liberating of additional gas from the oil entering the chamber.

37. In the art of treating oil, the steps of passing oil into a chamber while separating impurities from the oil with a gas space above the surface of the oil, heating the oil, creating an increase of pressure on the gas in said gas space causing a reabsorption of at least a part of the gas by the oil and causing a discharge of oil from the chamber sufficient to lower the pressure and to permit the liberating of additional gas from the oil entering the chamber.

WILBURN D. CHAMPION.